United States Patent Office 3,454,640
Patented July 8, 1969

3,454,640
ALKOXY- OR ALKYLTHIO-ALKYLENE-AMINOALKYLGUANIDINES
James Harold Short, Lake Forest, Ill., assignor to Abbott Laboratories, North Chicago, Ill., a corporation of Illinois
No Drawing. Filed July 25, 1966, Ser. No. 567,352
Int. Cl. C07c 133/10
U.S. Cl. 260—564                                    8 Claims

ABSTRACT OF THE DISCLOSURE

Alkoxy- or alkylthio-alkyleneaminoguanidines wherein all alkyl and alkylene groups are linear and saturated and limited to 2-3 carbon atoms exhibit blood pressure lowering activity when orally or intravenously administered to warm-blooded animals.

---

The present invention is directed to a new series of guanidines; more particularly it is directed to alkoxy- or alkylthioalkyleneaminoalkylguanidines, their salts, and the intermediates from which they are made.

The new compounds of the present invention have the formula

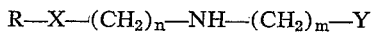

$$R-X-(CH_2)_n-NH-(CH_2)_m-Y$$

wherein $n$ is 2 or 3 and $m$ is 1 or 2, R is methyl or ethyl, X is sulfur or oxygen and Y is nitrile, aminomethyl or guanidylmethyl [—$CH_2NHC(:NH)NH_2$]. The compounds wherein Y is nitrile or aminomethyl are the important intermediates from which the compounds are made wherein Y is guanidylmethyl. The latter are physiological compounds exhibiting blood pressure lowering activity in warm-blooded animals when administered orally at dosages of between 2 and 30 mg./kg. or when administered intravenously at dosages between 2 and 10 mg./kg. The effect of the new compounds can be measured by observing their actions on the nictitating membrane of the cat. Blood pressure studies carried out with the new guanidine derivatives show that following an initial short increase of the blood pressure after intravenous application, the resulting blood pressure-lowering effect lasts for periods ranging between two hours and three days depending on the dosage used. For instance, a single, oral administration of the sulfate salt of 2-(2-methylthioethylamino)ethylguanidine shows effects lasting between one and three days at dosages of between 5 and 30 mg./kg.

In a general embodiment, an alkylthioalkyleneamine or an alkoxyalkyleneamine is reacted with hydroxyacetonitrile in an inert solvent such as an alcohol, benzene or water at 60–150° C. for several hours. The solvent is then removed, the intermediate substituted aminoacetonitrile is distilled under reduced pressure and the nitrile is reduced to the corresponding amine with a hydrogenation agent such as lithium aluminum hydride, diborane or the like in a water-free ether, e.g. dioxane, diethyl ether or tetrahydrofuran at a temperature between —10° and 100° C. to form an amine complex almost instantaneously. The excess hydrogenation agent and the amine complex are decomposed by adding a small amount of water followed by the addition of an alkali hydroxide. The precipitated inorganic salts are filtered off, the filtrate is dried and the solvent is removed. The free amine is distilled and then reacted with an acid addition salt of 2-alkyl-2-thio-pseudourea by combining the two reactants in water at a ratio of about 1:1 and at a temperature of between 0–50° C. for several hours. The water is then removed from the reaction mixture by evaporation and the new guanidines are recrystallized from an appropriate solvent.

In a simplified procedure for making the alkylthioethylaminoalkylguanidines, an aminoalkylaziridine wherein the term "alkyl" represents an ethyl or a propyl group ($m+1$ in the above formula) is reacted with about one equivalent of a 2-methyl- or 2-ethyl-2-thiopseudourea salt at 0–50° C. in water.

For better understanding of the process leading to the new intermediates and new pharmacologically valuable compounds of the invention, reference is made to the following examples which are given only as illustrations:

EXAMPLE 1

1-(3-aminopropyl)aziridine

By following the procedure of Bestian (Ann., 566, 243 of 1950), 96 g. of 1-(2-cyanoethyl)aziridine is reduced to a colorless oil boiling at 73–77° C. at 40 mm. Hg. pressure as compared to 61-62° (19 mm.) observed by Bestian. A yield of 42 g. of 1-(3-aminopropyl)aziridine is obtained showing a refractive index ($n_D$) of 1.4538 at 25° C.

EXAMPLE 2

2-ethyl-2-thiopseudourea sulfate

A solution of 37 g. of 2-ethyl-2-thiopseudourea hydrobromide (described in Organic Syntheses, Coll. vol. 3, p. 440 of 1955) in 100 ml. of water is added to a suspension of 31 g. of silver sulfate in 800 ml. of water and the mixture is heated on a steam bath for one hour. After cooling and filtering, the filtrate is evaporated and the residue is recrystallized from aqueous methonal to give 14.4 g. of 2-ethyl-2-thiopseudourea sulfate melting at 225–226°.

EXAMPLE 3

3-methylthiopropylamine

A suspension of 11.4 g. of lithium aluminum hydride in 200 ml. of dry ether is stirred and cooled in an ice/salt bath while 40 g. of 3-methylthiopropionitrile in 200 ml. of dry ether is added dropwise at such a rate that the temperature remains at 0°. Stirring is continued for another two hours after completion of the addition and the formed complex and excess metal hydride are decomposed by the dropwise addition of 12 ml. of water, 12 ml. of 15% aqueous sodium hydroxide followed by another 36 ml. of water while the temperature is maintained at 0° C. The formed solid is removed by filtration after standing at room temperature overnight. The solvent is removed from the filtrate and the residue is distilled under reduced pressure to yield 15.6 g. of 3-methylthiopropylamine boiling at 56–57° (8 mm.); $n_D^{25}$ 1.4906. The pure compound has a boiling point of 169° at atmospheric pressure.

EXAMPLE 4

3-methylthiopropylaminoacetonitrile

A solution of 31 g. of 3-methylthiopropylamine and 25 g. of 70% hydroxyacetonitrile in 150 ml. of ethanol is heated under reflux for four hours. The solution is then filtered to remove a small amount of solid material and the solvent is removed from the filtrate. Vacuum distillation of the residue produces 25 g. of 3-methylthiopropylaminoacetonitrile as a colorless oil boiling at 113–116° (0.3 mm.); $n_D^{25}$ 1.4960.

EXAMPLE 5

2-(3-methylthiopropylamino)ethylamine

By following the procedure of Example 3, 25.4 g. of 3-methylthiopropylacetonitrile is reduced in refluxing ether to yield 10.1 g. of 2-(3-methylthiopropylamino)ethylamine boiling at 121–123° (12 mm.); $n_D^{25}$ 1.5006.

EXAMPLE 6

3-(3-methylthiopropylamino)propionitrile

A solution of 16 g. of acrylonitrile in 31.5 g. of 3-methylthiopropylamine is allowed to stand at room temperature overnight and then subjected to vacuum distillation to give 38.8 g. of 3-(3-methylthiopropylamino)-propionitrile as a colorless oil boiling at 154–156° (10 mm.); $n_D^{25}$ 1.4930.

EXAMPLE 7

3-(3-methylthiopropylamino)propylamine

By following the procedure of Example 3, 38 g. of 3-(3-methylthiopropylamino)propionitrile is converted to 3-(3-methylthiopropylamino)propylamine obtained in a yield of 68% of theory and showing a boiling point of 130–132° (10 mm.); $n_D^{25}$ 1.4996.

EXAMPLE 8

2-methoxyethylaminoacetonitrile

A mixture of 115 g. of 65–70% aqueous 2-methoxyethylamine, 82 g. of 70% aqueous hydroxyacetonitrile and 500 ml. of benzene is heated under reflux conditions using a Dean-Stark trap to remove water. After several hours of refluxing, the solvent is removed and the residue is distilled to give 67.1 g. of 2-methoxyethylaminoacetonitrile as a colorless oil boiling at 97–98° (12 mm.); $n_D^{25}$ 1.4324.

EXAMPLE 9

2-(2-methoxyethylamino)ethylamine

Reduction of 67 g. of 2-methoxyethylaminoacetonitrile with lithium aluminum hydride according to the procedure of Example 3 produces 4.6 g. of 2-(2-methoxyethylamino)ethylamine as a colorless oil boiling at 74–76° (10 mm.); $n_D^{25}$ 1.4436.

EXAMPLE 10

2-(2-methylthioethylamino)ethylguanidine sulfate

A solution of 43 g. of 1-(2-aminoethyl)aziridine (described by Bestian, Ann. 566, p. 243 of 1950; B.P. 130–132° C.) and 70 g. of 2-methyl-2-thiopseudourea sulfate (described in Organic Syntheses, Coll. vol. 2, p. 411 of 1943) in 500 ml. of water is allowed to stand at room temperature overnight. The solution is then evaporated and the residue is crystallized from a mixture of 500 ml. of ethanol and 100 ml. of methanol to yield 52 g. of white crystalline 2-(2-methylthioethylamino)ethylguanidine sulfate melting at 168.5 to 170° C.

When the above pseudourea salt is replaced by an equivalent amount of pseudourea hydrochloride, 2-(2-methylthioethylamino)ethylguanidine hydrochloride is obtained.

EXAMPLE 11

3-(2-methylthioethylamino)propylguanidine sulfate

A solution of 10 g. of 1-(3-aminopropyl)aziridine and 14 g. of 2-methyl-2-thiopseudourea sulfate in 25 ml. of water is allowed to stand overnight. To this solution is then added 2.8 ml. of concentrated sulfuric acid and the solid which precipitates upon chilling is collected and recrystallized twice from 50% aqueous methanol to give 20.3 g. of white, crystalline 3-(2-methylthioethylamino)-propylguanidine sulfate melting at 233.5–235° C.

EXAMPLE 12

2-(2-ethylthioethylamino)ethylguanidine sulfate

A solution of 7.0 g. of 1-(2-aminoethyl)aziridine and 12.5 of 2-ethyl-2-thiopseudourea sulfate in 20 ml. of water is left at room temperature overnight. Removal of the solvent and recrystallization of the residue from ethanol yields 10.2 g. of crystalline white 2-(2-ethylthioethylamino)ethylguanidine sulfate melting at 150–151° C.

EXAMPLE 13

2-(3-methylthiopropylamino)ethylguanidine sulfate

A solution of 14.8 g. of 2-(3-methylthiopropylamino)-ethylamine and 13.9 g. of 2-methyl-2-thiopseudourea sulfate in 25 ml. of water is allowed to stand at room temperature overnight. Upon removal of the solvent and recrystallization of the residue from ethanol, 11.5 g. of 2-methylthiopropylamino)ethylguanidine sulfate melting at 172–172.5° C. is obtained.

EXAMPLE 14

3-(3-methylthiopropylamino)propylguanidine sulfate

A solution of 22 g. of 3-(3-methylthiopropylamino)-propylamine and 19 g. of 2-methyl-2-thiopseudourea sulfate in 35 ml. of water is left several hours at room temperature. After adding 3.8 ml. of concentrated sulfuric acid, the mixture is evaporated and the residue is recrystallized twice from aqueous ethanol to give 33.2 g. of glistening white leaflets of 3-(3-methylthiopropylamino)-propylguanidine sulfate melting at 247–248° C.

EXAMPLE 15

2-(2-methoxyethylamino)ethylguanidine sulfate

A solution of 6.3 g. of 2-(2-methoxyethylamino)ethylamine and 7.5 g. of 2-methyl-2-thiopseudourea sulfate in 25 ml. of water is left at room temperature overnight before adding 1.4 ml. of concentrated sulfuric acid. The mixture is diluted with 100 ml. of methanol and 100 ml. of acetone, chilled and filtered to produce 11.8 g. of crystalline white 2-(2-methoxyethylamino)ethylguanidine sulfate melting at 252–253° C.

In all the above examples, the analytical results are in close agreement with the values calculated from the corresponding empirical formulae.

It will be seen from the above examples that the process leading to the guanidines and their acid addition salts specified in the present invention is a very simple one. The alkylthioalkylaminoalkylguanidines can be made by reacting an alkylthioalkylaminoalkylamine or an aminoalkylaziridine with an acid addition salt of a 2-alkyl-2-thiopseudourea while the corresponding alkoxy derivatives are made by reacting the above pseudourea salt with an alkoxyalkylaminoalkylamine. In both instances, the two reactants are mixed in water and allowed to react with one another over a period of several hours. The ratio between the reactants may vary over a wide range but most economically, about equimolar amounts should be used. The resulting salt of the new guanidine derivative can be isolated from the reaction mixture by removal of the water. The addition of a further equivalent of the acid involved prior to the removal of the water may be necessary to obtain the new guanidine salt in crystalline form.

It will also be seen from the examples that the acid which forms the acid addition salt with the thiopseudourea derivative does not take part in the reaction itself but that the guanidine derivative resulting from the reaction is then obtained as an acid addition salt with the same acid. A variety of thiopseudourea acid addition salts can be used in the reaction but those wherein the acid is physiologically acceptable are preferred; when the acid is physiologically undesirable, the resulting new guanidine salt is useful in the preparation of those guanidine salts which can safely be administered to warm-blooded animals. The most common such salts are the hydrochloride, sulfate, phosphate, citrate and acetate salts.

I claim:
1. A compound of the formula

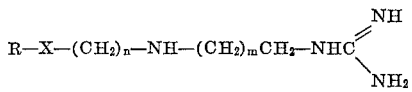

wherein $n$ is 2 or 3, $m$ is 1 or 2, R is methyl or ethyl, and X is sulfur or oxygen, or an acid addition salt thereof.

2. The compound of claim 1 wherein $m$ and $n$ both are 2, R is methyl, and X is sulfur, or an acid addition salt thereof.

3. The compound of claim 1 wherein $m$ is 1, $n$ is 2, R is methyl, and X is sulfur, or an acid addition salt thereof.

4. The compound of claim 1 wherein R is methyl, $n$ is 3, $m$ is 1, and X is sulfur, or an acid addition salt thereof.

5. The compound of claim 1 wherein R is methyl, X is sulfur, $m$ is 2, and $n$ is 3, or an acid addition salt thereof.

6. The compound of claim 1 wherein R is methyl, $m$ is 1, $n$ is 2, and X is oxygen, or an acid addition salt thereof.

7. An acid addition salt of the compounds of claim 1 wherein said acid addition salt is formed with a physiologically acceptable acid.

8. The process of making salts of a guanidine of the formula

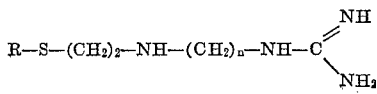

wherein $n$ is 2 or 3, and R is ethyl or methyl, consisting essentially in reacting a compound of the formula

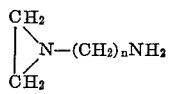

wherein $n$ has the above meaning, with a molar equivalent of an acid addition salt of a compound of the formula

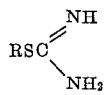

in water at a temperature of between 0° and 50° C. for several hours and isolating the guanidine salt from the reaction mixture.

References Cited

UNITED STATES PATENTS

| | | | |
|---|---|---|---|
| 3,200,151 | 8/1965 | Spickett et al. | 260—564 |
| 3,201,459 | 8/1965 | Coda et al. | 260—564 X |
| 3,202,710 | 8/1965 | Bolger | 260—564 |
| 3,291,829 | 12/1966 | Mull | 260—564 |

FOREIGN PATENTS 367,820  4/1963  Switzerland.

CHARLES B. PARKER, *Primary Examiner.*

S. T. LAWRENCE III, *Assistant Examiner.*

U.S. Cl. X.R.

260—239, 465.1, 465.5, 501.14, 583, 584; 424—326